April 28, 1964   A. L. KRAUSE ETAL   3,130,436
WINDSHIELD SCRAPER
Filed Jan. 18, 1960
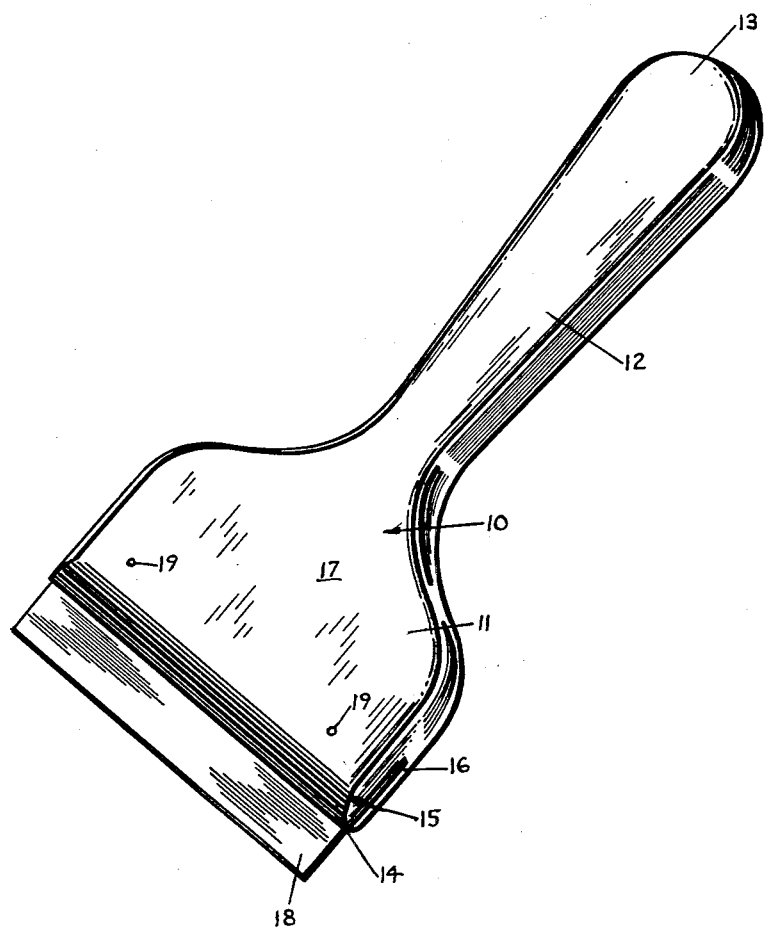
INVENTORS
ALBERT L. KRAUSE
MARTIN C. KRAUSE
BY
ATTORNEY United States Patent Office 3,130,436
Patented Apr. 28, 1964

3,130,436
WINDSHIELD SCRAPER
Albert L. Krause and Martin C. Krause, both of R.F.D. 1, Wattsburg, Pa.
Filed Jan. 18, 1960, Ser. No. 2,986
1 Claim. (Cl. 15—236)

This invention relates to scrapers and, especially, to scrapers for use in scraping snow and ice from glass such as vehicle winshields and the like.

Previous scrapers have been provided for this purpose made of plastic material. The scraping edge of this plastic material must be thick because of the brittle nature of the plastic usually used and it is difficult to retain a thin edge on the plastic. Further, many plastic materials are abrasive and will injure the glass. Other plastic materials are brittle and easily damaged in storage and transportation. Many other scrapers have been made of steel and other hard metals which are efficient in scraping ice, but at the same time, are inclined to scratch the glass.

It is, accordingly, an object of the present invention to provide an improved scraper for scraping ice from glass surfaces.

Another object of the invention is to provide an improved scraper having a brass blade.

A further object is to provide an improved scraper which is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

The drawing shows an isometric view of a windshield scrapper according to the invention.

Now with more specific reference to the drawing, a scraper 10 is shown having a handle with an enlarged blade receiving section 11 and a hand engaging section 12. The section 12 is small at the integral portion which attaches to the blade receiving section 11 and tapers into an enlarged outer end 13 which is contoured to give a pleasing appearance.

The blade receiving end 11 has generally square corners 14 and the straight end has smoothly curved edges at 15 to provide a pleasing appearance and to allow the blade to assume more nearly a right angular position to the windshield of a vehicle. A slot 16 is formed in the end generally centrally thereof and parallel to side surfaces 17. A brass blade 18 is received in the slot 16. The blade 18 is in the form of a generally rectangular shaped plate which is preferably fit snugly into the slot 16 and it may even be pressed into the slot 16 or held therein by pins 19 which fit in holes in the handle and in the blade 18. The blade 18 could also be held in place in the slot 16 by means of glue or other adhesive.

In order for the blade material to have sufficient strength to withstand scraping ice from glass and yet be soft enough not to scratch the glass, it has been discovered that it must be made from brass or Phosphor bronze within the tensile strength range of sixty-eight thousand pounds per square inch minimum to one hundred and five thousand pounds per square inch maximum. It has also been discovered that if the brass or Phosphor bronze used is outside of this range, it will either scratch the glass if it is harder or it will itself be damaged if it is softer. It will, therefore, not be suitable for the intended purpose.

Other materials such as aluminum are abrasive to the glass and will scratch it if used. Steel, for example, is too hard and will scratch the glass. Also, some steels are inclined to work harden in use and would not be suitable.

In use, the scraper 10 is held by the handle in the hand of the operator with the index finger of the hand pointing toward the brass blade 18. By pressing the brass blade 18 to the glass surface to be cleaned at a slight angle and pushing against the ice, snow or frost across the glass and parallel to it, it will leave a clear, clean path and, by subsequent motion parallel to the one just made, the ice can be removed until all of the glass is cleared with less effort than with other known scrapers. The brass will not scratch the glass nor will it chip and leave unclean surfaces.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A scraper for windshields or the like comprising a handle, said handle being made of non-metallic material having a slot therein, and a relatively thin plate like rectangular blade, said blade being disposed in said slot and held rigidly therein, a portion of said blade extending outwardly from said handle and presenting a generally straight side for engaging ice to be scraped from glass, said blade being made of a material taken from a group of either brass or Phosphor bronze having a tensile strength within the range of sixty-eight thousand pounds per square inch and one hundred five thousand pounds per square inch.

References Cited in the file of this patent

UNITED STATES PATENTS

| | | |
|---|---|---|
| D. 122,685 | Jones | Sept. 24, 1940 |
| 1,538,521 | Sheridan | May 19, 1925 |
| 1,704,376 | Teasdale | Mar. 5, 1929 |
| 2,155,462 | Anderson | Apr. 25, 1939 |
| 2,242,992 | Devor | May 20, 1941 |
| 2,277,528 | Osborn | Mar. 24, 1942 |
| 2,686,968 | Almlof | Aug. 24, 1954 |